United States Patent [19]

Orschek

[11] Patent Number: 5,394,137

[45] Date of Patent: Feb. 28, 1995

[54] VEHICLE PARKING BRAKE DETECTION AND WARNING SYSTEM

[75] Inventor: Edward J. Orschek, North East, Pa.

[73] Assignee: General Electric Company, Erie, Pa.

[21] Appl. No.: 59,694

[22] Filed: May 10, 1993

[51] Int. Cl.$^6$ ............................................. B60Q 1/00
[52] U.S. Cl. .................................. 340/453; 340/438; 340/457; 340/457.3; 340/459; 188/1.11
[58] Field of Search ............... 340/438, 441, 453, 457, 340/457.3, 459, 460, 461; 188/1.11; 116/208

[56] References Cited

U.S. PATENT DOCUMENTS

| | | | |
|---|---|---|---|
| 1,183,031 | 5/1916 | Price | 340/457.3 |
| 1,435,675 | 11/1922 | Vollmer et al. | 340/457.3 |
| 3,646,515 | 2/1972 | Vodehnal | 340/468 |
| 3,651,457 | 3/1972 | Sprouse | 340/457.3 |
| 4,853,689 | 8/1989 | Gray et al. | 340/453 |
| 4,855,709 | 8/1989 | Naderi | 340/457.3 |
| 4,855,712 | 8/1989 | Wiley, Jr. et al. | 340/453 |
| 4,967,182 | 10/1990 | Foster | 340/457.3 |

*Primary Examiner*—John K. Peng
*Assistant Examiner*—Edward Lefkowitz
*Attorney, Agent, or Firm*—Jill M. Breedlove; Marvin Snyder

[57] ABSTRACT

A computer based parking brake detection and warning system and method includes pressure sensors for sensing a pressure in a parking brake line to detect that a parking brake has been activated. The computer waits a predetermined period of time after detecting that the parking brake has been activated. The system determines parking brake warning levels based on the speed of the vehicle, detecting the activation of the parking brake, and based upon whether power has been requested by an operator. The system activates a visual and audible alarm in response to the determining of a warning level when the speed is above or below a predetermined threshold. Multiple levels of warning levels are used depending upon the speed of the vehicle.

16 Claims, 5 Drawing Sheets

VEHICLE PARKING BRAKE DETECTION AND WARNING SYSTEM

BACKGROUND OF THE INVENTION

The invention relates generally to vehicle parking brake detection and warning systems and more particularly to parking brake detection and warning systems adapted for air parking brake systems, such as air parking brake systems for locomotives.

Traditional parking brake systems typically include a lever which is connected to a cable or chain which actuates a parking brake mechanism to apply a brake when the lever is pulled. Parking brake detection systems are known which activate a dashboard light when a parking brake lever has been pulled, such as found in automobiles. Generally, the dashboard light notifies the driver that the parking brake lever has been activated so that the driver does not continue to drive the vehicle and consequently burn out the brakes.

Conventional parking brake systems for locomotives use a mechanical linkage mechanism which allows the operator to pull a lever or rotate a wheel which then pulls a cable or chain linkage to actuate a parking brake. A problem arises with known parking brake detection and warning systems in that such mechanically linked systems are often cumbersome to actuate given the mass and length of such linkages. In addition, the mere illumination of a dashboard or console light sometimes fails to adequately apprise the vehicle operator that a parking brake is activated. For example, in a locomotive, the operator may not be present in the cab during movement of the locomotive and, hence, may not be apprised of the visual indication of the parking brake activation.

Other locomotive parking brake systems are known which attempt to reduce the mechanical linkage of traditional systems. One such system is a spring applied-/air release type parking brake system. These systems typically have springs that apply a brake shoe to a wheel in the absence of air line pressure. The parking brake is released when an operator opens a valve to allow air pressure into the air line to cause the spring to release the brake shoe. However such systems are not generally equipped with detection and warning systems to adequately apprise the operator of an improper parking brake condition.

Another problem with known parking brake detection and warning systems is that the parking brake may endure severe degradation as the speed of the vehicle increases. Therefore, it would be advantageous to have a parking brake detection and warning system which determines a warning condition based on vehicle speed and provides different warning levels dependent on the vehicle's speed so that the operator may take appropriate action.

SUMMARY OF THE INVENTION

Accordingly, it is a general object of the present invention to substantially overcome the above-identified problems of conventional parking brake systems.

It is yet another object of the present invention to provide a parking brake detection and warning system which substantially prevents an operator of a vehicle from unnecessarily wearing down the parking brake.

It is a further object of the invention to provide a vehicle parking brake detection and warning system for locomotives which is adapted for use with a parking brake configuration which employs air pressure parking brake lines to facilitate easier parking brake actuation by the operator and to reduce the complexity of the mechanical linkage for actuating the parking brake.

It is yet another object of the present invention to provide a vehicle parking brake detection and warning system which may provide audible and visual warning indications for an operator of the vehicle.

It is yet a further object of the present invention to provide a vehicle parking brake detection and warning system which employs multiple levels of protection depending on the current speed of the vehicle.

A vehicle parking brake detection and warning system includes a parking brake activation detection mechanism, such as parking brake air line pressure sensors, which are coupled to an electronic controller, such as a vehicle computer. The electronic controller may wait a predetermined period of time after detecting that the parking brake has been activated before determining whether an improper parking brake condition is present. The system includes a mechanism for determining the speed of the vehicle, such as a vehicle speed sensor, so that the electronic controller may determine a current speed of the vehicle. The electronic controller determines a parking brake warning level and takes actions depending upon which warning level has been detected. A first warning level is reached when the following conditions are detected: the parking brake is activated, the vehicle has reached a predetermined speed and engine power is concurrently requested by the operator. The controller may then activate an alarm in response to determining the warning level, such as providing a drive signal to an audible signal generating device. The controller then reads a stored warning message from memory and displays the stored message on a display terminal for the operator of the vehicle to view. A second parking brake warning level is acknowledged when the following conditions are detected by the controller: the parking brake is activated and the vehicle has reached a speed greater than the predetermined speed set for the first level.

Preferably, the parking brake system is a spring-activated and air-pressure releasable parking brake system. The pressure in an air line of the parking brake is used to determine whether the parking brake has been activated.

A method for detecting and generating a warning of an undesirable parking brake condition for a vehicle is also disclosed. The method includes detecting that the parking brake has been activated; waiting a predetermined period of time after detecting that the parking brake has been activated; determining the speed of the vehicle; determining whether power is being requested; determining a warning level based upon detecting the activation of the parking brake, detecting that power is being requested and based upon the speed of the vehicle; and activating an alarm when a warning level is reached.

DESCRIPTION OF THE PREFERRED EMBODIMENTS

Figure 1:
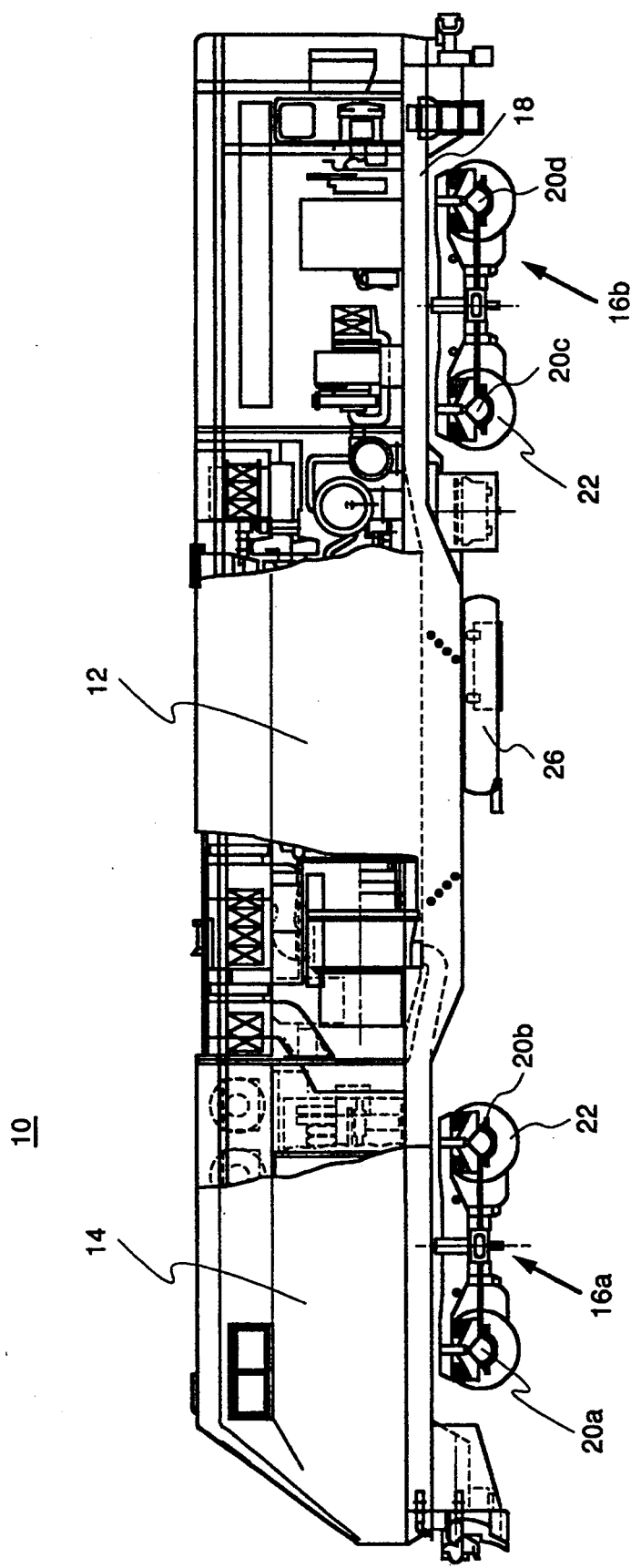
FIG. 1 is a side view of a locomotive which includes a parking brake detection and warning generating system in accordance with the invention.

FIG. 1 illustrates a passenger monocoque-type locomotive 10 powered by a diesel engine 12. The monocoque locomotive 10 has a cab 14 in the front which serves as the driving station for an operator. The monocoque locomotive 10 has a plurality of trucks generally indicated at 16a and 16b which are coupled to a platform 18 through a suitable suspension arrangement. Each of the plurality of trucks 16a and 16b have two axles 20a, 20b and 20c and 20d, respectively, which are fixedly connected to respective wheels 22a–22h. A parking brake air reservoir 26 is connected to the platform 18 and will be described with reference to FIG. 2.

Figure 2:
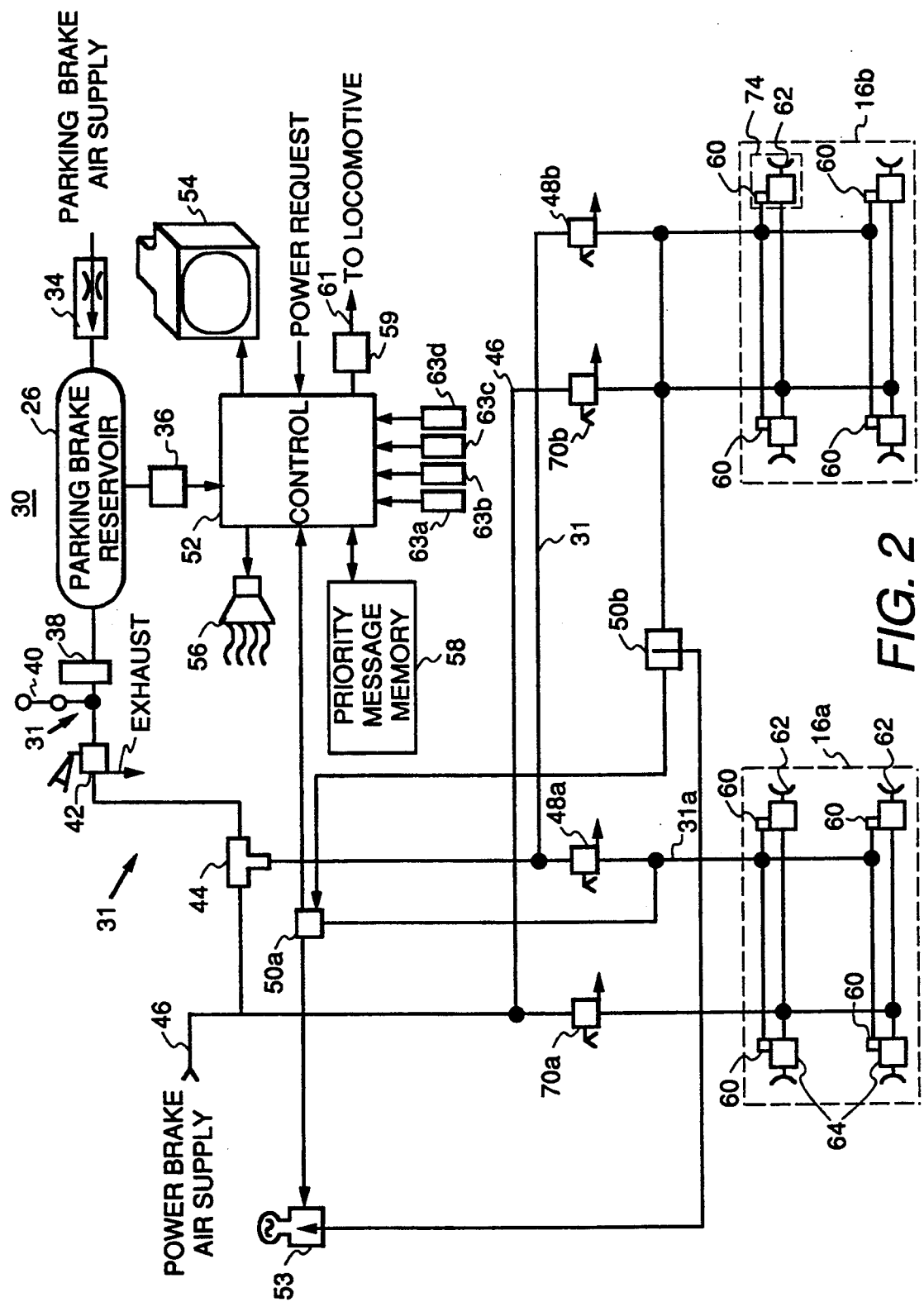
FIG. 2 is a schematic generally depicting a parking brake system and detection and warning system in accordance with the invention.

FIG. 2 schematically depicts a parking brake detection and warning system generally indicated as 30 wherein a spring-applied/air release parking brake system is used to actuate and release the parking brake. The parking brake system includes a parking brake air supply source 32 which may include an air compressor. The parking brake air supply source 32 feeds the parking brake reservoir 26 through a check valve and choke 34. The parking brake reservoir 26 has a drain cock 36 for draining the pressure in the parking brake reservoir 26. A regulator 38 regulates the pressure from the parking brake reservoir 26 to a suitable pressure of approximately 100 p.s.i. for a parking brake air line 31. The parking brake reservoir 26 may have a pressure of approximately 130 psi to 140 psi. A pressure gauge 40 connected to the air brake line 31 indicates the pressure in the parking brake air line 31.

A manual actuating valve 42 located in operator's cab 14 is used to actuate the parking brake. The manual actuating valve 42 includes a cut-out valve and is adapted to bleed air to the atmosphere. When the manual actuating valve 42 is closed, the parking brake is applied. When the manual actuating valve 42 is open, the parking brake is released. A double-check valve 44 allows pressure from a power brake line 46 to enter the parking brake line 31a to override the parking brake to avoid double braking. The double check valve 44 also prevents power brake line 46 pressure from entering the air reservoir 26 through parking brake air line 31.

A plurality of cut-out valves 48a and 48b in the parking brake air line 31 serve as valves to facilitate external actuation of the parking brake for either truck 16a or 16b to isolate the rest of the parking brake circuit. The cut-out valves 48a and 48b may be used during testing purposes or maintenance operations. The parking brake air line 31 also includes a plurality of parking brake line pressure sensors 50a and 50b. Each of the parking brake line pressure sensors 50a and 50b may be a General Electric (G.E.) pressure switch with bellows such as a G.E. pressure switch No. CR127B201AC, available from the G.E. General Purpose Control Department, Bloomington, Ill.

Figure 3:
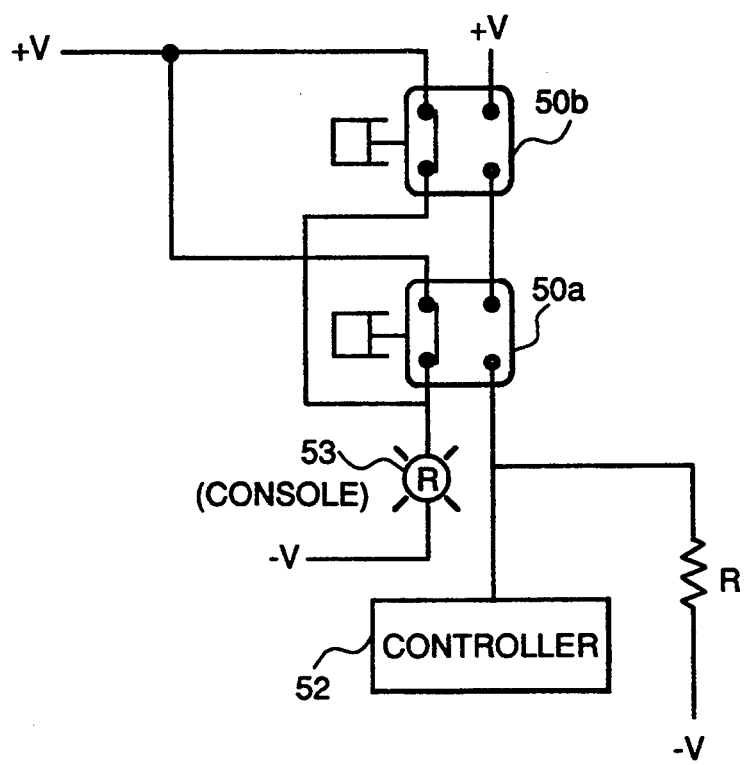
FIG. 3 is an electrical schematic diagram depicting pressure sensor connections for the pressure sensors shown in FIG. 2.

The parking brake line pressure sensors 50a and 50b are connected as shown in FIG. 3 to produce an output signal responsive to the pressure in the parking brake line 31 by switching after sensing a preset pressure threshold. The output signal is coupled to a controller 52, such as an engine control computer. A console parking brake light 53 turns on when either or both pressure sensors 50a and 50b switch to indicate lack of suitable pressure in the parking brake air line 31 and 31a. The controller 52 is coupled to a visual display terminal 54 which is located in the operator cab 14 in any suitable location.

The controller 52 is also coupled to an audible alarm 56, such as a bell, which is suitably located to generate an audible warning signal in the operator's cab 14. The controller 52 also couples to a priority warning message memory 58, such as a ROM or RAM device. The priority warning message memory 58 stores the parking brake warning messages that are displayed on the display console. The controller 52 determines which warning message to display and displays the warning messages on a priority basis as will be described later.

The controller 52 also couples to a relay 59 which activates a signal line 61 that is connected among the locomotive 10 and all other locomotives to notify all of locomotives that a fault has occurred. Any of the locomotives may activate the signal line 61.

The parking brake air line 31 connects to respective parking brake mechanisms generally indicated at 60. When the parking brake is applied (insufficient air pressure in the parking brake air line 31 and 31a), the parking brake mechanisms 60 cause the brake shoes 62 to come in contact with the wheels 22. Speed sensors 63a–63d, are positioned on respective traction motors (not shown) provide speed input signals to the controller 52. There is one traction motor for each axle.

When the power brake is activated, a power brake mechanism generally indicated by block 64 causes the brake shoes 62 to come in contact with the wheels 22. The power brake line 46 also includes cut-out valves 70a and 70b which perform substantially the same function as cut-out valves 48a and 48b for the parking brake line 31.

In the spring applied/air release parking brake configuration of FIG. 2, a single brake unit, generally indicated at 74, is associated with each wheel. The braking unit 74 includes two chambers, a chamber for the power braking mechanism and a chamber for a parking braking mechanism. Activation of the parking brake (lack of suitable brake line pressure) causes a spring in the braking unit 74 to force the braking shoe 62 against a corresponding wheel. The spring applied force is released by air pressure in the parking brake line 31 forcing the spring to release the braking mechanism. This serves as a fail safe parking brake system since failure to provide suitable brake line pressure will cause the parking brake to activate. The braking unit 74 may be a model PC216LF, available from Knorr-Bremse A.G.

FIG. 3 illustrates the serial connection between the pressure sensors 50a and 50b. As shown, the parking brake is applied thereby causing both pressure sensors 50a and 50b to provide a current path for the console light 53. The switching of either sensor will turn on the console light 53. Both pressure sensors 50a and 50b are required to complete the circuit to provide an input signal to the controller 26 that the parking brake has been released. The resistor R serves as a load to provide a proper input signal level to the controller 26. The pressure sensors 50a and 50b are preset to open (parking brake activated) when air line pressure drops below about 70 p.s.i. The pressure sensors 50a and 50b are preset to close (parking brake deactivated) at approximately 82 p.s.i.

Figure 4A:
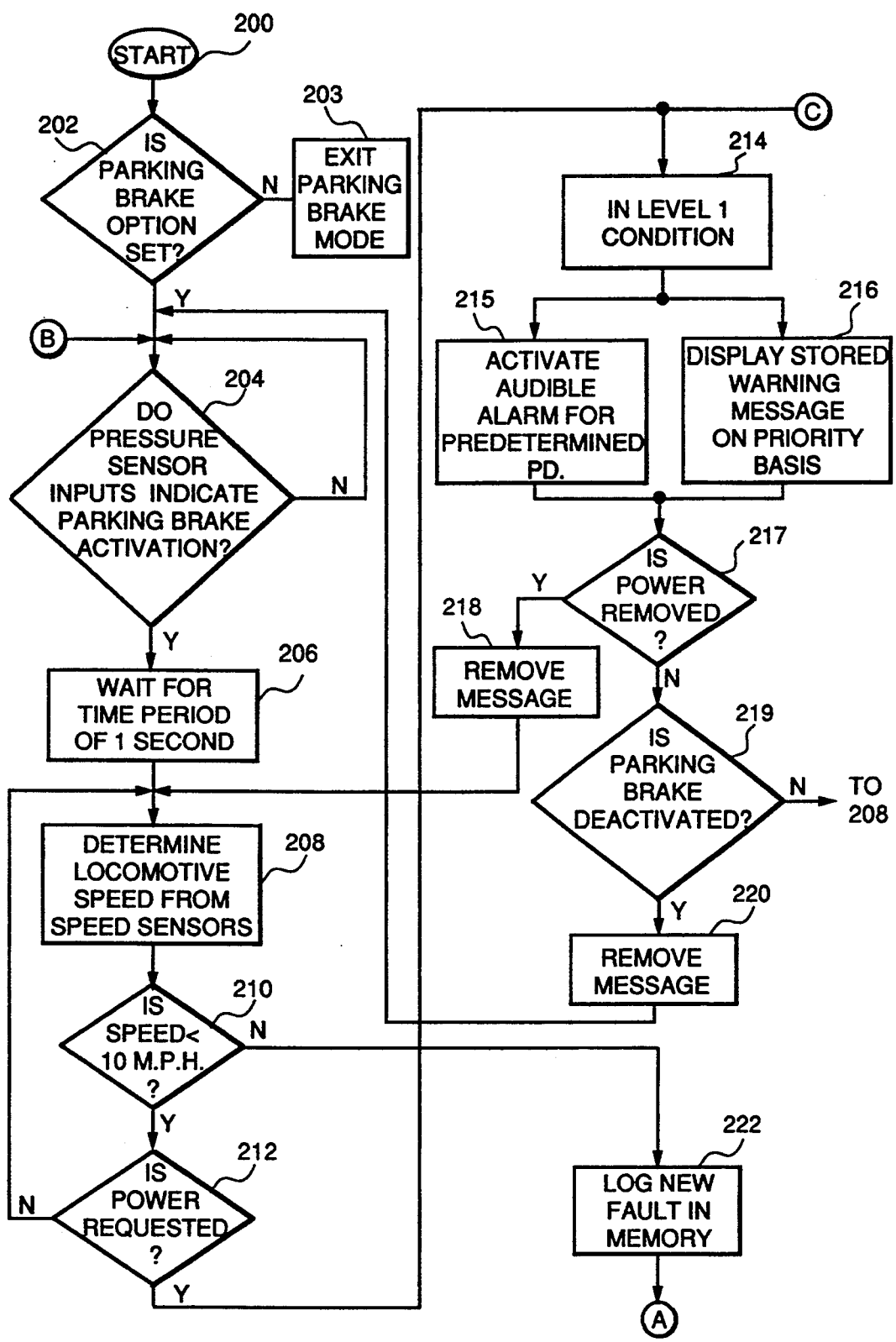
FIGS. 4A and 4B is a flow diagram generally depicting a method for detecting an undesirable parking brake condition and determining a parking brake warning level in accordance with the invention.
Figure 4B:
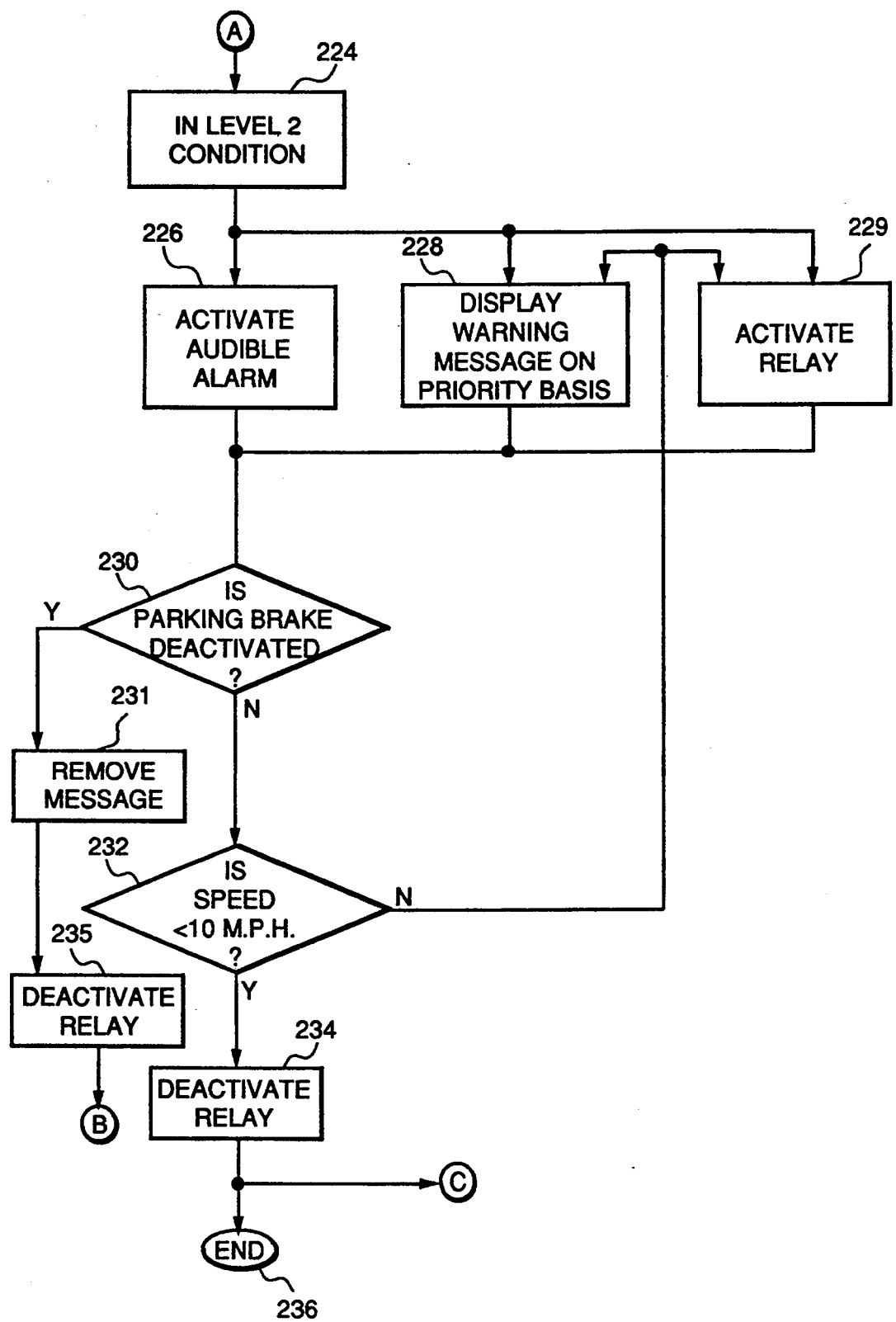

FIGS. 4A and 4B depict a method for detecting an undesirable parking brake condition and determining a parking brake warning level in accordance with the invention. The method may start as indicated in block 200. Also, referring to FIGS. 2 and 3, the electronic controller 52 determines if the power braking option has been set by the manufacturer by checking a bit in an option select register in the memory of the engine control computer as indicated in block 202. If the option bit is not set, the controller 52 will exit the parking brake detection mode as shown in block 203.

As indicated by block 204, the electronic controller 52 then determines whether the parking brake has been actuated by evaluating the input signal from the pressure sensors 50a and 50b. If the input signal from the pressure sensors 50a and 50b indicates that the parking brake has been activated, the electronic controller 52 may then wait a predetermined period, such as one second, in order to confirm that the actuation of the parking brake is not an anomaly, as shown in block 206. The controller may use an internal clock or counting method to calculate the predetermined period of time. If the parking brake is not actuated, the electronic controller may continue sampling the input signal from the pressure sensors and act when parking brake actuation is detected.

If the electronic controller 52 determines that the parking brake has been activated, the electronic controller will then check the speed of the locomotive as indicated in block 208. The speed of the locomotive is obtained from output signals from the vehicle speed sensors 63a–63d.

As shown in block 210, if the speed is below a predetermined threshold, such as 10 miles per hour (mph), the electronic controller then checks if the operator has requested power, as shown in block 212. For example, the electronic controller may check one of its inputs to determine whether a particular notch (power level) has been selected by the operator. The power request may be in the form of a throttle request.

If the parking brake has been activated, if the locomotive is moving less than 10 miles per hour, and if the operator has requested power, the electronic controller determines that it is in a first warning level (level 1) as shown in block 214. The controller then activates the alarm 56 as shown in block 215. For example, the controller may activate a bell or other audible signal generating device in the cab 14 of the locomotive 10 to indicate to the operator that the parking brake is on during a period when the operator has engaged the engine. The alarm may be activated for a first predetermined period of time, such as five seconds, whereafter the alarm may be automatically shut off by the electronic controller. The alarm serves to notify the operator to look at the display console 54 to determine the nature of the malfunction or problem. The alarm is activated based on the occurrence of a transition from idle to a power state. Hence, when the locomotive is currently in a power state (not in idle) and additional power is requested, the alarm will only be activated for one predetermined time period.

As indicated in block 216, the controller 52 also displays a warning message on the display console 54 which is visible to the operator. This may be done by displaying one or a plurality of stored warning messages which are stored in the priority message memory 58 that is accessible by the controller. The warning message may be prioritized to have a higher priority than standard messages so that the controller first displays the warning message prior to displaying standard messages. For example, a message such as "WARNING!! PARKING BRAKE APPLIED!" may be moved ahead of a standard message in a display queue so that the warning message appears on the display console prior to less important messages. Hence the parking brake warning message may have a higher priority than other messages selected to be displayed. In block 217, the controller checks the power request input to determine whether the power request has been removed (e.g. whether locomotive is idling). If the power request has been removed, as shown in block 218, the warning message is removed and the controller determines the vehicle's speed.

If the power request has not been removed, the controller continues to check if the parking brake is still actuated as shown in block 219. The bell continues to be activated for the 5 second period. If the parking brake has been deactivated, the message is removed as shown in block 220. The controller may then continue back to block 204 to check the pressure sensors to detect parking brake activation. If the parking brake continues to be activated, the controller returns to block 208 to determine the vehicle's speed.

Referring back to block 210, if the speed is greater than or equal to 10 miles per hour, the system will then store a new fault record as part of a maintenance log indicated in block 222 which indicates a second warning level mode (level 2). A second warning level is recognized by the electronic controller as shown in block 224. Recognition of the second warning level may then be used to activate the alarm mechanism such as an audible mechanism for a predetermined period of time as indicated by block 226. For example, the bell may be activated for a longer, 30 second, period indicating a more severe fault since the locomotive is attempting to move with more power than the previous warning level. The electronic controller also displays warning messages on the display console similar to that described with reference to block 218 as shown in block 228.

Also, the controller activates the relay 59 as indicated in block 229 if the parking brake is still activated. When the controller 52 activates relay 59, the audible output device 56 is activated and can not be shut off until the parking brake is deactivated. The controller determines if the parking brake has been deactivated as shown in block 230. If the parking brake is deactivated, the controller will remove the warning message (block 231) and deactivate the relay as shown in block 235 and returns to block 204 to continue monitoring the parking brake status. If the parking brake is not deactivated, the system continues to determine whether or not the locomotive is slowing down, as shown in block 232. When the speed of the locomotive is less than 10 miles per hour, the system will then deactivate the relay 59 as shown in block 234 and continue to monitor the speed and operate in a level one condition. If the speed continues to rise, then the system again activates the relay 59 and displays a warning message. The process will end as shown in block 236 when power to the controller is removed, such as when the locomotive is shut off.

With the above embodiment, no operational restrictions are imposed in response to detection of an improper parking brake condition. However, the controller may be suitably programmed to limit operation of the locomotive in response to such a condition. For example, the amount of fuel may be limited by the controller so that the locomotive may not exceed a predetermined power output level.

Specific embodiments of novel methods and apparatus for detecting and generating a warning of an undesirable parking brake condition for a vehicle have been described for the purposes of illustrating the manner in which the invention may be used and made. It should be understood that the implementation of other variations and modifications of the invention, in its various aspects, will be apparent to those of ordinary skill in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A vehicle parking brake detection and warning system comprising:
    means for detecting that a parking brake has been activated;
    means, operatively coupled to the detecting means, for waiting a predetermined period of time after detecting that the parking brake has been activated;
    means for determining a speed of the vehicle;
    means, responsive to the speed determining means and to the parking brake detecting means, for determining a first parking brake warning level based upon detecting the activation of the parking brake, detecting a power request by an operator and based upon the speed of the vehicle; and
    means for activating alarm means in response to determining the first parking brake warning level.

2. The system of claim 1 wherein the means for determining the first parking brake warning level also determines a second parking brake warning level based on whether the parking brake is activated and whether the vehicle has reached a speed greater than a predetermined speed threshold set for the first parking brake warning level.

3. The system of claim 1 wherein the parking brake is a spring activated and air pressure releasable parking brake.

4. The system of claim 1 wherein the parking brake detection means includes pressure sensors for sensing a pressure in a parking brake air line.

5. The system of claim 3 wherein the vehicle is a locomotive.

6. A locomotive parking brake detection and warning system comprising:
    storage means for storing warning messages;
    means for detecting that a parking brake has been activated;
    means, operatively coupled to the detecting means, for waiting a predetermined period of time after detecting that the parking brake has been activated;
    means for determining a speed of the locomotive;
    means, responsive to the speed determining means and to the parking brake detecting means, for determining a parking brake warning level based upon detecting the activation of the parking brake, detecting a power request by an operator and based upon the speed of the locomotive;
    means for activating an audible alarm in response to determining the parking brake warning level; and
    means for displaying a warning message stored in the storage means in response to the warning signal.

7. The system of claim 6 wherein the parking brake is a spring activated and air pressure releasable parking brake.

8. The system of claim 6 wherein the means for displaying includes controller means coupled to visual display means wherein the controller means causes the warning messages to be displayed on a priority basis over standard messages.

9. The system of claim 7 wherein the parking brake detection means includes pressure sensors for sensing a pressure in a parking brake air line.

10. A method for detecting and generating a warning of an undesirable parking brake condition for a vehicle, the method comprising the steps of:
    detecting that a parking brake has been activated;
    waiting a predetermined period of time after detecting that the parking brake has been activated;
    determining a speed of the vehicle;
    determining whether power is being requested;
    determining a parking brake warning level based upon detecting the activation of the parking brake, detecting that power is requested and based upon the speed of the vehicle; and
    activating alarm means in response to determining the parking brake warning level.

11. The method of claim 10 wherein detecting includes receiving a signal from pressure sensing means that is adapted to sense the pressure of a parking brake line.

12. The method of claim 11 wherein the vehicle is a locomotive and the parking brake is a spring activated and air pressure releasable parking brake.

13. A method for detecting and generating a warning of an undesirable parking brake condition for a vehicle, the method comprising the steps of:
    storing warning messages in a storage means;
    detecting that a parking brake has been activated;
    waiting a predetermined period of time after detecting that the parking brake has been activated;
    determining a speed of the vehicle;
    determining whether power is being requested;
    determining a parking brake warning level based upon detecting the activation of the parking brake, detecting that power is requested and based upon the speed of the vehicle;
    activating an audible alarm in response to determining that a parking brake warning level has been reached; and
    displaying a warning message stored in the storage means based upon said parking brake warning level.

14. The method of claim 13 wherein the step of storing includes programming the warning messages in a memory of a vehicle controller.

15. The method of claim 14 wherein detecting the activation of the parking brake includes receiving a signal from pressure sensing means that is adapted to sense the pressure of a parking brake line.

16. The method of claim 13 wherein the vehicle is a locomotive and the parking brake is a spring activated and air pressure releasable parking brake.

* * * * *